United States Patent
Ding et al.

(10) Patent No.: US 9,432,912 B2
(45) Date of Patent: Aug. 30, 2016

(54) DEVICE ACCESS METHOD, ACCESS POINT AND ACCESS DEVICE

(71) Applicant: Huawei Device Co., Ltd., Shenzhen, Guangdong (CN)

(72) Inventors: Zhiming Ding, Shenzhen (CN); Tianyu Wu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 83 days.

(21) Appl. No.: 14/460,869

(22) Filed: Aug. 15, 2014

(65) Prior Publication Data

US 2014/0376536 A1    Dec. 25, 2014

Related U.S. Application Data

(63) Continuation of application No. PCT/CN2013/071486, filed on Feb. 7, 2013.

(30) Foreign Application Priority Data

Feb. 17, 2012   (CN) .......................... 2012 1 0037166

(51) Int. Cl.
| | |
|---|---|
| H04W 74/04 | (2009.01) |
| H04W 48/10 | (2009.01) |
| H04W 48/12 | (2009.01) |
| H04W 74/00 | (2009.01) |
| H04W 88/08 | (2009.01) |

(52) U.S. Cl.
CPC .............. *H04W 48/10* (2013.01); *H04W 48/12* (2013.01); *H04W 74/006* (2013.01); *H04W 74/04* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2005/0002346 A1 | 1/2005 | Bichot | |
| 2005/0036510 A1* | 2/2005 | Sarikaya | ............... H04W 68/08 370/469 |

(Continued)

FOREIGN PATENT DOCUMENTS

| | | |
|---|---|---|
| CN | 1600037 A | 3/2005 |
| CN | 101300882 A | 11/2008 |

(Continued)

OTHER PUBLICATIONS

Park, "Station Group Management for 802.11ah," IEEE 802.11-11/0762r0, Slides 1-9, Institute of Electrical and Electronics Engineers, New York, New York (May 10, 2011).

(Continued)

*Primary Examiner* — Kodzovi Acolatse
(74) *Attorney, Agent, or Firm* — Leydig, Voit & Mayer, Ltd.

(57) ABSTRACT

Embodiments of the present invention disclose a device access method, an access point, and an access device. The method includes: generating, by an access point, a broadcast frame, where the broadcast frame includes a feature identifier of an access device; and sending, by the access point, the broadcast frame, so that the access device that receives the broadcast frame and corresponds to the feature identifier in the broadcast frame accesses the access point. The present invention may be adopted to resolve a problem that numerous conflicts occur when numerous terminals simultaneously access a network, so that the terminals can successfully access the network.

15 Claims, 7 Drawing Sheets

(56) References Cited

U.S. PATENT DOCUMENTS

| | | | |
|---|---|---|---|
| 2006/0193315 A1* | 8/2006 | Sinivaara | H04W 48/10 370/389 |
| 2007/0015523 A1* | 1/2007 | Prakash | H04W 68/00 455/458 |
| 2007/0207788 A1 | 9/2007 | Phan et al. | |
| 2008/0146253 A1* | 6/2008 | Wentink | H04W 52/0216 455/458 |
| 2008/0220769 A1* | 9/2008 | Qi | H04W 52/0216 455/426.1 |
| 2009/0061851 A1* | 3/2009 | Kitazoe | H04W 68/00 455/426.1 |
| 2010/0204827 A1* | 8/2010 | Michenet | B65H 5/04 700/229 |
| 2011/0069651 A1 | 3/2011 | Kangude et al. | |
| 2013/0094484 A1* | 4/2013 | Kneckt | H04W 4/02 370/338 |
| 2013/0208667 A1* | 8/2013 | Merlin | H04W 68/025 370/329 |
| 2013/0217359 A1* | 8/2013 | Cherian | G06F 15/177 455/411 |
| 2013/0294261 A1* | 11/2013 | Ghosh | H04W 28/14 370/252 |
| 2014/0105116 A1 | 4/2014 | Ding et al. | |

FOREIGN PATENT DOCUMENTS

| | | |
|---|---|---|
| CN | 101453409 A | 6/2009 |
| WO | WO 2007051910 A1 | 5/2007 |
| WO | WO 2007052888 A2 | 5/2007 |
| WO | WO 2009113798 A2 | 9/2009 |

OTHER PUBLICATIONS

Liu et al., "DCF Enhancements for Large Number of STAs," IEEE 802.11-11/1255r0, Slides 1-11, Institute of Electrical and Electronics Engineers, New York, New York, (Sep. 15, 2011).

* cited by examiner

DEVICE ACCESS METHOD, ACCESS POINT AND ACCESS DEVICE

CROSS-REFERENCE TO RELATED APPLICATIONS

This application is a continuation of International Patent Application No. PCT/CN2013/071486, filed on Feb. 7, 2013, which claims priority to Chinese Patent Application No. 201210037166.1, filed on Feb. 17, 2012, both of which are incorporated herein by reference in their entireties.

TECHNICAL FIELD

The present invention relates to a wireless Internet, and in particular, to a device access method, an access point, and an access device.

BACKGROUND

In the existing Institute of Electrical and Electronics Engineers (IEEE) 802.11 standard, an access point access point (AP) can support a maximum of 2007 access devices (or referred to as Stations, STAs for short, which, in the 802.11 standard, refer to devices that support the 802.11 protocol). Actually, STAs connected to one AP are restricted by bandwidth of the AP, and a maximum of dozens to hundreds of STAs can be connected to one AP. When there are more users (for example, during a game in a stadium), an AP needs to be added to increase bandwidth resources.

The 802.11ah standard under development uses a free frequency spectrum below 1 GHz to cover a scope of 1 kilometer. The standard is used in application fields such as a smart meter and a smart sensor network. A feature of these applications is that a data amount of a terminal is very small, and a coverage area of an AP is large; therefore, a large number of terminals may be supported. For example, the AP needs to support more STAs. For example, the number of STAs increases to 6000.

However, if the AP is required to support more STAs and a plurality of STAs simultaneously contend for accessing a network, an existing contention mechanism cannot operate. Because an existing biggest contention backoff window is 1023, it is almost impossible to avoid a conflict when thousands of STAs contend for a channel. As a result, it is very difficult for the STAs to access the network, or access of the STAs to the network takes a long period.

SUMMARY

A technical problem to be resolved by embodiments of the present invention is to provide a device access method, an access point, and an access device, which may resolve a problem that numerous conflicts occur when numerous terminals simultaneously access a network, so that the terminals can successfully access the network.

Therefore, according to one aspect, an embodiment of the present invention provides a device access method, where the method includes:

generating, by an access point, a broadcast frame, where the broadcast frame includes a feature identifier of an access device paged by the access point, and the feature identifier is used to identify the access device paged by the access point; and sending, by the access point, the broadcast frame, so that the access device that receives the broadcast frame and corresponds to the feature identifier in the broadcast frame accesses the access point.

According to another aspect, an embodiment of the present invention further provides a device access method, where the method includes:

receiving, by a first access device, a broadcast frame sent by an access point, where the broadcast frame includes a feature identifier of an access device paged by the access point;

determining, by the first access device according to its own feature identifier and the feature identifier of the access device in the broadcast frame, whether the first access device is the access device paged by the access point; and accessing, by the first access device, the access point when a determining result is yes.

According to another aspect, an embodiment of the present invention further provides an access point, where the access point includes:

a frame generating unit, configured to generate a broadcast frame, where the broadcast frame includes a feature identifier of an access device paged by the access point, and the feature identifier is used to identify the access device paged by the access point; and a frame broadcasting unit, configured to send the broadcast fame, so that the access device that receives the broadcast frame and corresponds to the feature identifier in the broadcast frame accesses the access point.

According to another aspect, an embodiment of the present invention further provides an access device, where the access device includes:

a frame receiving unit, configured to receive a broadcast frame sent by an access point, where the broadcast frame includes a feature identifier of an access device paged by the access point;

a determining unit, configured to determine, according to its own feature identifier and the feature identifier of the access device in the broadcast frame, whether the access device is the device paged by the access point; and an access unit, configured to access the access point when a determining result is yes.

By implementing the embodiments of the present invention, the following beneficial effects are achieved: An access point actively pages an access device by carrying a paged feature identifier in a broadcast frame, and only an access device specified in the broadcast frame can initiate access. In this way, when the access point needs to support access of more devices, the access point may actively and effectively restrict the number of devices that access the access point by means of contention in a same period of time, thereby significantly improving access efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
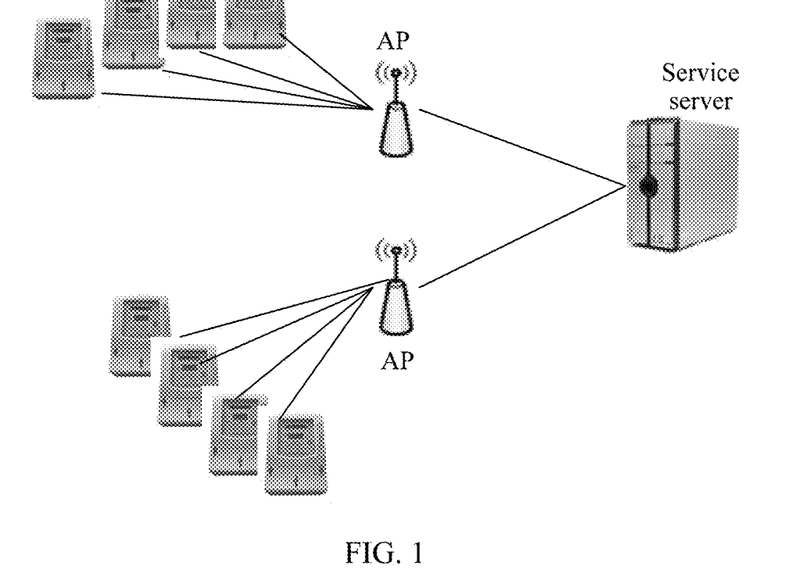
FIG. 1 is a schematic diagram of a topology of a network according to an embodiment of the present invention.

In the embodiments of the present invention, considering that access devices specified in the IEEE 802.11ah standard are mainly a smart meter, a device in a smart sensor network, and the like. These terminals on application networks are all permanently installed. Therefore, it may be known in advance which terminals need to access a specific AP. As a result, it may be implemented that the AP pages each STA for accessing a network. A paged STA accesses the network, and an unpaged STA waits to be paged. In this way, simultaneous contention by numerous terminals may be avoided, which enables the STAs to access the network in an orderly manner A topology of a network according to an embodiment of the present invention is shown in FIG. 1, where a wireless fidelity (WiFi) connection is established between access terminals (such as electricity meters) and an AP, and a service server stores identification information and geographical address information of the terminals, and certainly, also stores information about the AP that manages these terminals. The following specifically describes each embodiment of the present invention based on the foregoing network.

Figure 2:
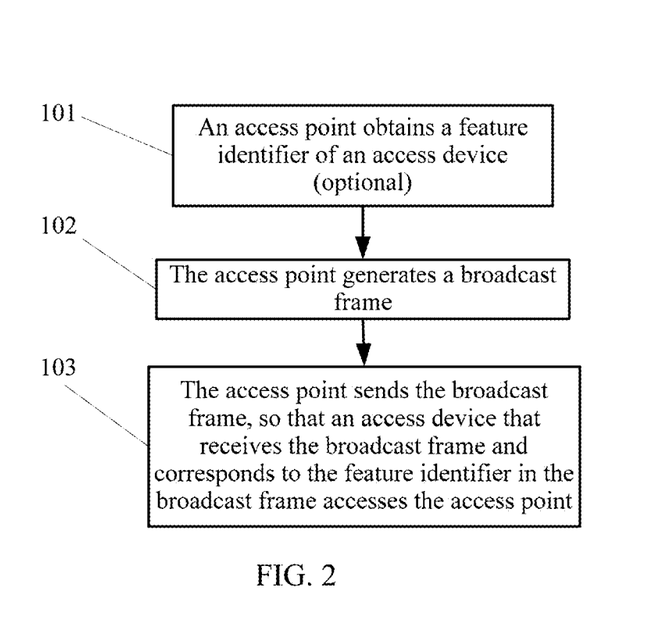
FIG. 2 is a schematic diagram of a specific process of a device access method according to an embodiment of the present invention.

As shown in FIG. 2, FIG. 2 is a schematic diagram of a specific process of a device access method according to an embodiment of the present invention. The method includes the following steps:

101. An access point obtains a feature identifier of an access device. This step is an optional step. Information about the feature identifier of the access device that is managed by the access point may be preconfigured on the access point. For example, the information is the feature identifier of the access device covered by the access point, where the feature identifier is sent by a service server to the access point.

Here, the access device may be a station(STA) in the 802.11 standard. The feature identifier of the access device may include a unique equipment identifier of the access device. Further, the unique equipment identifier may be a Medium Access Control (MAC) address of the device, and may also be another identifier or the like that can ensure uniqueness.

Generally, for a scenario in which the access device is fixed and stationary (such as an electricity meter of a family), the unique equipment identifier may be a locally unique identifier. For example, the unique equipment identifier is unique with respect to devices in the Guangzhou area, but it may be the same as identifiers of other devices in other areas. In other specific embodiments, the device identifier may be set when the device is delivered. A specific place for installing or using the device cannot be determined when the device is delivered. In order to avoid confusion, the unique equipment identifier may be set as a globally unique identifier. Usually, an MAC address of the device may be used as a unique identifier of the device, and the MAC address of the device has global uniqueness.

102. The access point generates a broadcast frame, where the broadcast frame includes the feature identifier of the access device. The broadcast frame may include a plurality of feature identifiers (such as the unique equipment identifier), and these identifiers are carried in the broadcast frame in a form of a list. Specifically, the broadcast frame may be a beacon frame (Beacon).

The access device may use an existing contention mechanism to access the access point by means of contention in a contention period of a current beacon period. Alternatively, further, the broadcast frame may further include information about a contention service period, so that the access device accesses the access point by means of contention in the contention service period. The contention service period is a service period separated from a contention free period specified by the AP, but the access device uses the contention mechanism defined by the present invention to access the access point within the service period.

A backoff window used by the access device in the contention service period meets: WL=N*tslot, N=[a*n]−1, and a length of the contention service period meets: L=b*N*tslot;

where WL denotes a maximum time duration of the backoff window; tslot denotes a timeslot; N denotes a value of a greatest multiple of the backoff window; n denotes the number of access devices included in the broadcast frame; a is a constant greater than 1; b is a constant greater than 1; and [ ] denotes rounding down.

Alternatively, the access device uses a contention free mechanism to access the access point. The broadcast frame further includes information about a contention free service period, and the information about the contention free service period includes the information about the contention free service period, so that the access device accesses the access point within a contention free service period of the access device. When the broadcast frame includes a list of feature identifiers of access devices, the contention free server information includes information about a contention free service period for each access device in the list.

103. The access point sends the broadcast frame, so that the access device that receives the broadcast frame and corresponds to the feature identifier in the broadcast frame accesses the access point.

Figure 3:
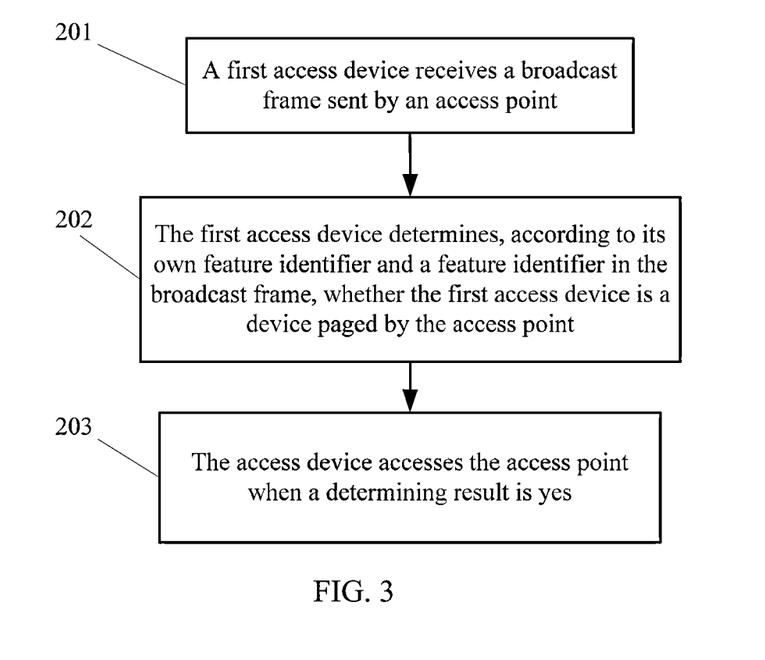
FIG. 3 is a schematic diagram of another specific process of a device access method according to an embodiment of the present invention.

Corresponding to the foregoing method, as shown in FIG. 3, an embodiment of the present invention further provides another device access method, which describes a process of accessing a device on a broadcast frame receiving side. The method includes the following steps:

201. A first access device receives a broadcast frame sent by an access point, where the broadcast frame includes a feature identifier of an access device. As described above, the feature identifier includes a unique equipment identifier.

Certainly, similar to the foregoing description, the broadcast frame may further include information about a contention service period or information about a contention free service period. If the broadcast frame does not include service period information of the access device, the access device uses a contention mechanism in an existing standard to access the access point by means of contention within a contention period of a current beacon period. If the broadcast frame includes the information about a contention service period, the access device uses a contention mechanism defined by the present invention to access the access point by means of contention within the specified service period. If the broadcast frame includes the information about a contention free service period, the access device accesses the access point within the specified service period.

A backoff window used by the access device in the contention service period meets: $WL=N*tslot$, $N=[a*n]-1$, and a length of the contention service period meets: $L=b*N*tslot$;

where WL denotes a maximum time duration of the backoff window; tslot denotes a timeslot; N denotes a value of a greatest multiple of the backoff window; n denotes the number of access devices included in the broadcast frame; a is a constant greater than 1; b is a constant greater than 1; and [ ] denotes rounding down.

Before this step, the following step may further be included: The access device performs passive scanning to discover an access point, and waits for the discovered access point to send the broadcast frame. The so-called passive scanning means that the access device intercepts the broadcast frame of the access point, and determines, by using information in the broadcast frame, whether the access point is an access point that the access device is to access. How the access device determines, by using the information in the broadcast frame of the access point, that the access point is the access point that the access device is to access is not within the scope of the present invention. Generally, the access device needs to obtain configuration in a service provisioning process. Information such as an identifier of the access point and a credential may be configured on the access device.

202. The first access device determines, according to its own feature identifier and the feature identifier of the access device in the broadcast frame, whether the first access device is a device paged by the access point.

203. The first access device accesses the access point when a determining result is yes. Certainly, when the determining result is no, the first access device cannot initiate access, but can only wait to be paged by the access point (that is, the first access device cannot initiate access until the access device in the received broadcast frame includes the first access device).

If the broadcast frame further includes information about a contention service period, at this time the access device accesses the access point by means of contention within the contention service period. Alternatively, if the broadcast frame further includes information about a contention free service period, and the contention free server information includes the information about a contention free service period, the access device accesses the access point within the contention free service period of the access device.

Further, the broadcast frame may include a list of access devices, and the list of access devices includes feature identifiers of the access devices (such as unique equipment identifiers). The information about a contention free service period includes a start time of the contention free service period and a time length for accessing the access point by the access device in a contention-free manner, then the accessing, by the access device, the access point within a contention free service period of the access device may specifically include: determining the contention free service period of the access device according to the start time of the contention free service period, the time length for accessing the access point by the access device in a contention-free manner, and a position of the unique equipment identifier of the access device in the list of access devices in the broadcast frame; and accessing, by the access device, the access point within the contention free service period of the access device according to the information about the contention free service period.

It can be learnt from the foregoing description that, an access point actively pages an access device by carrying a feature identifier of the access device in a broadcast frame, and only an access device specified in the broadcast frame can initiate access. In this way, when the access point needs to support access of numerous devices, the access point may actively and effectively restrict the number of devices that access the access point in a same period of time, thereby significantly improving access efficiency.

Meanwhile, in this embodiment of the present invention, two access manners are provided. One manner is contention access, in which a device may access an access point according to an existing contention mechanism, or an access point may set a contention service period, and a device can only initiate access within the set contention service period. The other manner is contention-free access, in which an access point sets a contention free service period and separately restricts a time period for contention-free access of each access device, and each device separately accesses the access point within its time period for contention-free access, thereby completely avoiding a conflict. The following further and separately describes a process of accessing a device by using a contention service period or a contention free service period. The contention access manner that uses the existing contention mechanism may be understood by a person skilled in the art, and is not described herein any further.

Figure 4:
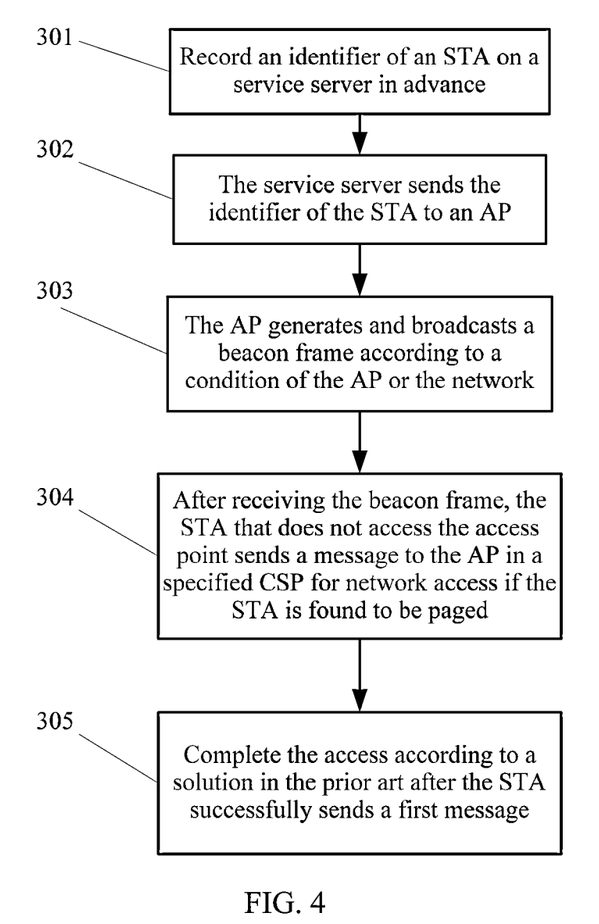
FIG. 4 is a schematic diagram of a process of accessing a device in a case in which a contention service period is set according to an embodiment of the present invention.

As shown in FIG. 4, FIG. 4 is a process of accessing a device in a case in which a contention service period is set. The process includes the following steps:

301. Record an identifier (such as an MAC address) of an STA on a service server in advance. For example, this step may be completed in a service provisioning process or during device installation.

The service provisioning process refers to a process in which a user applies for an account so that a terminal may access a network. In the progress, a service provider may need to record user information, user equipment information, and the like, and may configure a device. For example, a household needs to open a water account, an electricity account, and a gas account when moving into a house, and then meters may be opened for using. For smart meters, that is, an electricity meter, a water meter, and a gas meter that are all intelligent, it is easier to implement whether a corresponding service (that is, power supply, water supply, or the like) is provided, and an account-opening process of the household may be more convenient, but the account-opening process is still required. By using a smart electricity meter as a specific example, an electric power company may have recorded identification information (an MAC address of a communications interface of the electricity meter or a manufacturer serial number of the device) of the electricity meter in advance and an address of a room where the electricity meter is installed; therefore, when a user opens an account, the user may only activate the electricity meter and may remotely control the electricity meter for power supply.

For a smart sensor, each sensor also has identification information, and the identification information of the sensor may be recorded into the service server on a sensor network after the sensor is installed.

302. The service server sends the identifier of the STA to an AP. For example, after the user opens the account, the service server sends identification information of the STA to the AP that manages the STA.

303. The AP generates and broadcasts a beacon frame according to a condition of the AP or the network. The AP carries a list of paged STAs in the beacon frame, and specifies a contention service period (CSP), which, certainly may not be specified in other specific embodiments.

When the identifier of the STA has just been sent to the AP, this STA certainly has not established an association with the AP, and then the AP pages those STAs that are managed by the AP but are not associated with the AP. The AP determines, according to whether a current air interface is busy with communication, that a limited number of STAs, for example, 100, 10, or even only one, are paged each time by using the beacon frame. When a system is very busy, it is possible that no STA is paged for the moment. An unassociated STA is paged when the air interface is relatively idle.

Figure 5:
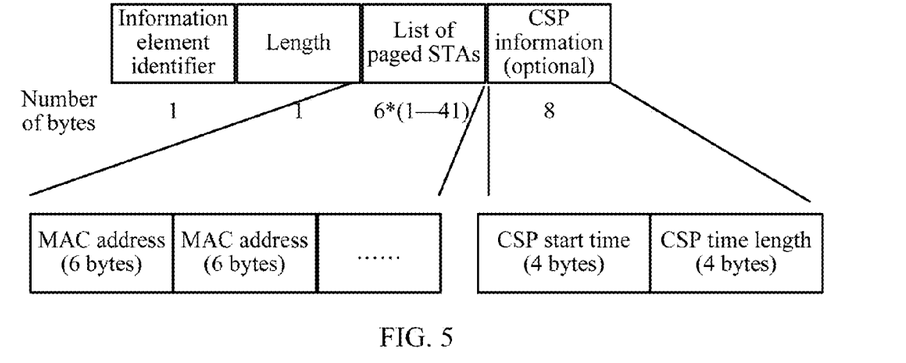
FIG. 5 is a schematic diagram of a data structure of a broadcast frame in a case in which a contention service period is set.

A data structure of an information element of the contention service period included in the beacon frame in this embodiment may be shown in FIG. 5:

1. Information element identifier: indicates an identifier of this information element. One information element is one data structure, and data of different aspects is encapsulated in each information element.

2. Length: indicates how many bytes in the following belong to this information element, including the length field.

3. List of paged STAs: an MAC address (assuming that the MAC address is used as the identifier of the access device) of the paged STA (the access device), where each MAC address occupies 6 bytes. The number of the paged STAs included in one information element is restricted by a maximum length of the information element, but a plurality of elements of this type may be included in the beacon frame if the AP wants to page more STAs at a time.

4. CSP information: The AP allocates one CSP to all paged STAs and specifies a start time of the CSP and a time duration of the CSP. The CSP is a time period for using a channel by the paged STAs, within which only these paged STAs use the channel by means of contention, and other STAs that are unpaged do not use the time period, thereby significantly reducing an extent of the contention. A CSP Start Time refers to the start time of the CSP, which may be an absolute time and may also be an offset relative to the beacon frame; a time length of the CSP refers to a time duration of the service period, that is, a time length of the service period.

It is defined that a CSP field has 8 bytes whereas the MAC address has 6 bytes. Therefore, although the CSP is optional and a length of the MAC address list is variable, the device that receives the beacon frame may still learn by calculation whether there is the CSP field and how many MAC addresses there are according to a value of the length field. Certainly, if the device that receives the beacon frame cannot obtain information about whether there is the CSP field and information about the number of the MAC addresses by using a length of the information element, a field may be added before the list of paged STAs in the beacon frame to indicate whether there is the CSP field or to indicate the number of the MAC addresses.

Figure 6:
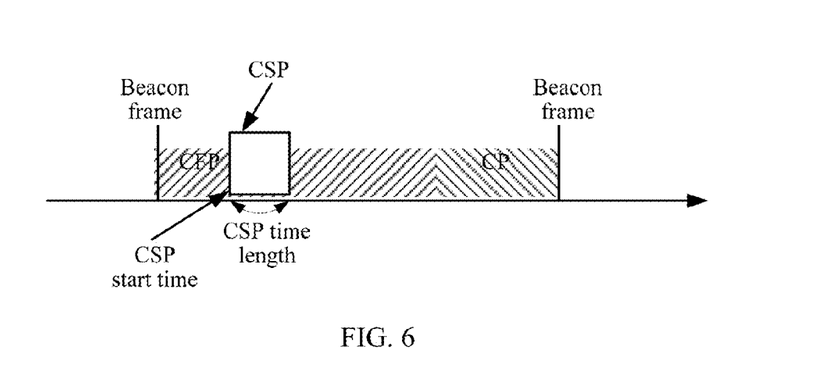
FIG. 6 is a schematic diagram of a relationship between a CSP and a CFP in a case in which a contention service period is set.

As shown in FIG. 6, FIG. 6 is a relationship between a contention free period (CFP) and a contention service period (CSP) according to an embodiment of the present invention. The CFP is a period of time delimited by an access point, which usually includes several service periods and each service period is used by a specified STA, thereby avoiding contention. The CSP is a part of the CFP, but the CSP itself is of contention. The CSP is a service period (SP) in the contention free period (CFP), and this service period serves the foregoing paged STAs. For an unpaged STA, this period of time is still contention-free, that is, the unpaged STA cannot access the access point by using this period of time. Because the time is very short, a contention backoff mechanism in an existing standard cannot be used.

Assuming that the number of STAs included in an information element in a list of paged STAs is n, where the information element is included by the AP in a latest beacon frame, a maximum value N (a unit is in timeslot) of a backoff window set by a paged STA is a certain multiple of n. The multiple is set to a, and a may be set to 1.2 to 2, so that the backoff windows generated by the STA may fall within this scope but they are different. In this way, no conflict occurs. If a is too great, waste is too serious.

N=[a*n]−1, where N denotes a maximum multiple value of the backoff window; n denotes the number of access devices included in the beacon frame; a is a constant greater than 1; b is a constant greater than 1; and [ ] denotes rounding down.

A length of the CSP (a time length of the CSP) is b*N and is converted into the number of microseconds, and for a value of b, a relationship between a required time from sending a message by the STA to receiving a response message ACK of the AP and the timeslot is considered, and b is not less than 1. For example, one timeslot may be 20 microseconds, whereas a required average time from sending the message by the STA to receiving the ACK is 35 microseconds. In this case, b may be set to 2, that is, the time length of the CSP is 2*N*20 microseconds.

304. After receiving the beacon frame, the STA that does not access the access point sends a message to the AP for network access in a specified CSP if the STA is found to be paged. In this embodiment, because the AP specifies the CSP, the STA must access the network in the specified CSP and wait to be paged next time if missing the time.

For example, when the CSP starts, the STA generates a random number 0<d<=N, and then backs off from contending for the channel. If a conflict occurs, the STA gives up this opportunity to access the network and waits to be paged next time. That is, the STA attempts to send the message only once during a CSP period.

Further designed, the STA may set the value of d of the STA according to a position of the MAC address of the STA in the list of paged STAs. In this way, the value of d can never be duplicated, thereby completely avoiding a conflict. But even so, there is also a case of a transmission failure due to external interference or the like. If the STA fails to send the message, the STA gives up this opportunity to access the network and waits to be paged next time.

305. After the STA successfully sends a first message, subsequent steps may continue to be performed in a contention period, or a certain special mechanism is used to complete interaction of subsequent messages. For example, after responding to a last message of the STA each time, the AP arranges a time point for the STA to send a next message in passing. Details are not described herein. An entire process from successful transmission of the first message by the STA to completion of network access may span a beacon interval (BI), that is, the progress is not limited by a beacon period.

Figure 7:
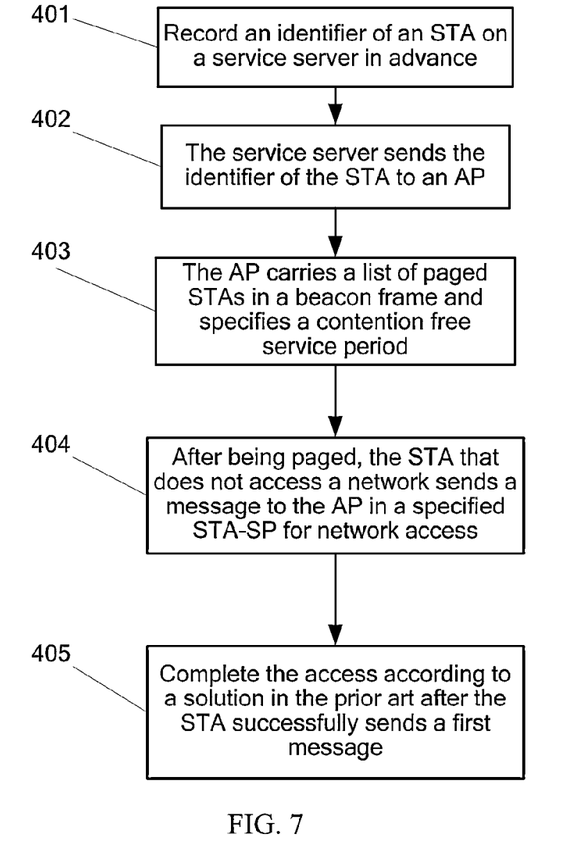
FIG. 7 is a schematic diagram of a process of accessing a device in a case in which a contention free service period is set according to an embodiment of the present invention.

As shown in FIG. 7, FIG. 7 is a process of accessing a device in a case in which a contention free service period is set. The process includes the following steps:

401. Record an identifier (such as an MAC address) of an STA on a service server (Server) in advance.

402. The Server sends the identifier of the STA to an AP.

403. The AP carries a list of paged STAs in a beacon frame, and specifies a contention free service period (CFSP).

A main difference between this solution and the previous one is that the AP specifies a contention free service period CFSP rather than a CSP when paging the STA. The CFSP is also located in the CFP, but it is a real contention free SP.

Figure 8:
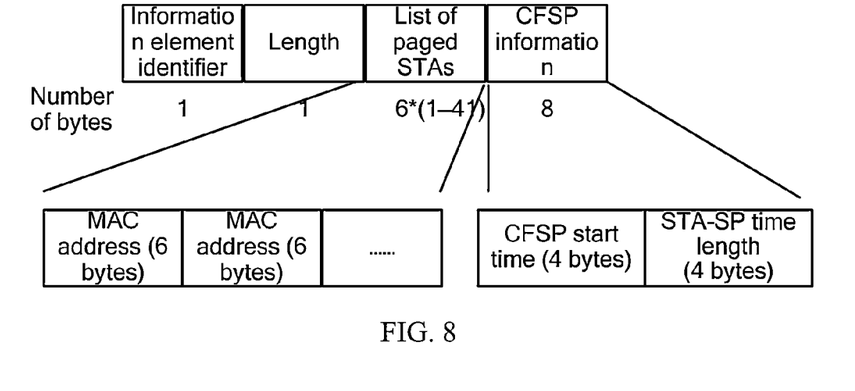
FIG. 8 is a schematic diagram of a data structure of a broadcast frame in a case in which a contention free service period is set.

The beacon frame in this embodiment includes a CFSP information element shown in FIG. 8, where the information element includes:

(1) CFSP start time: indicates a start time of the CFSP, which is set in the same manner as the CSP start time in the previous solution.

(2) STA-SP time length: indicates a time length for using a channel by each paged STA rather than a length of the entire CFSP. The length of the entire CFSP needs to be calculated by multiplying this value by the number of paged STAs.

In this embodiment, assuming that the AP knows that a first message sent by the STA when the STA accesses a network all has a definite maximum length, a maximum time required for sending the first message by the STA is known. Therefore, contention may be avoided in a manner of arranging an SP for each STA in advance. For a value of the STA-SP, not only a possible maximum length of the message sent by the STA needs to be considered, a time for responding to, by the AP, the message sent by the STA also needs to be included. This response is a control message and a very short frame with a fixed length, rather than a message from the AP for responding to the message sent by the STA. If the STA does not receive a corresponding response frame within a specified time after sending the message, it indicates a transmission failure.

Figure 9:
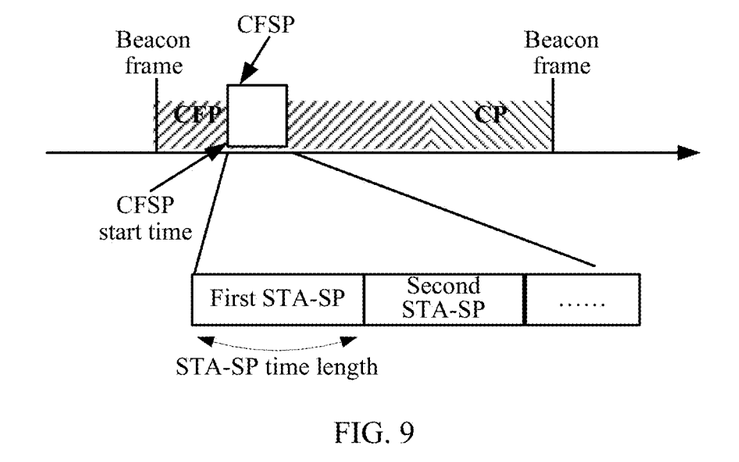
FIG. 9 is a schematic diagram of a relationship between a CSP and a CFP in a case in which a contention free service period is set.

As shown in FIG. 9, FIG. 9 shows a relationship between a CFSP and a CFP. The CFSP is a period of time in the CFP, and is further formed by several STA-SPs. Each STA-SP is exclusively occupied by one specified STA, and no contention exists.

404. After being paged, the STA that does not access the network sends a message to the AP in a specified STA-SP for network access; and needs to wait to be paged next time if missing the time. In this embodiment, the STA needs to determine a start time of its own STA-SP according to the CFSP start time, an STA-SP period, and a position of the STA in a list of access devices.

405. After the STA successfully sends the first message, subsequent steps are consistent with those in an existing solution, and details are not described herein again. An entire process may span a BI.

The foregoing describes a process in which the AP actively pages the STA for access mainly from a direction of the AP, and for an STA side, before the STA accesses the network, the STA may discover the AP by means of passive scanning, and then may switch a channel among APs that meet a condition, so as to receive a broadcast frame sent by the AP. Certainly, in the process of waiting to be paged, the STA does not need to intercept each broadcast frame and may intercept a broadcast frame every 10 beacon periods or a longer time, in order to save power. Intercepting is receiving, and any signal in the air may be received; however, according to address information, a frame that is not of the STA is discarded. Because the STA may not know a channel of a target AP, the STA needs to intercept the broadcast frame on each channel. This process is referred to as passive scanning. The STA implements interception on only one channel at a time, and therefore, the channel needs to be switched to implement successive interception.

In addition to a process of accessing the STA that does not access the network, this embodiment of the present invention may be further used in a process of accessing the STA after the STA restarts. That is, after the STA restarts, the STA may establish a connection with the AP again, but the STA still cannot actively send a first message (for example, a probe request frame) and must wait to be paged by the AP. If the AP still fails to receive data of the STA over a certain period (for example, 1.1 or 1.5 multiples of a transmission period), it is determined that the STA is offline. In this case, the AP initiates the paging by using the foregoing solution.

It can be learnt from the foregoing description that, when an AP pages a plurality of STAs at a time, these STAs may be allowed to access the network by means of contention in a contention period (that is, similar to a contention period when the STA actively initiates access in the prior art), and the STA must complete the transmission of the first message within a specified time, over which the first message may not be sent again and the STA must wait to be paged next time; the STA may also be arranged to access the network by means of contention within a service period and this service period (that is, the foregoing contention service period) is located in the contention free period for other unpaged STAs, and the unpaged STAs do not access the network by means of contention in the contention service period. The STA that has accessed the network does not send any message in this service period either. However, for the paged STA, this contention service period is a short contention period, and the STA must complete transmission of a first frame within this service period. If the transmission is not completed, the STA must wait to be paged next time, and the STA must send the first message only in this service period. The STA may further be arranged to send the first message at a fixed time point or in a fixed time period of the contention free period (that is, the foregoing contention free service period) and the time cannot be missed; otherwise, the STA must wait to be paged next time.

Corresponding to the foregoing method embodiment, the present invention further provides an access point and an access device, which are separately described in the following.

Figure 10:
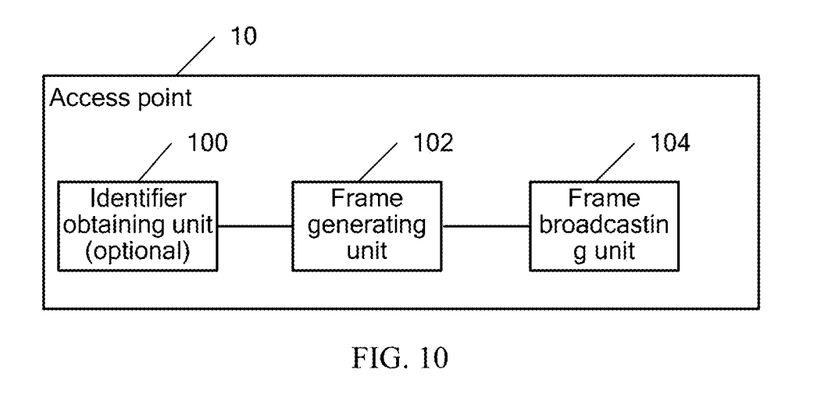
FIG. 10 is a schematic diagram of specific composition of an access point according to an embodiment of the present invention.

As shown in FIG. 10, the access point 10 includes: an identifier obtaining unit 100, configured to obtain a feature identifier of an access device, where the feature identifier includes a unique equipment identifier of the access device (this unit is an optional unit); a frame generating unit 102, configured to generate a broadcast frame, where the broadcast frame includes the feature identifier of the access device, and the feature identifier is used to identify an access device paged by the access point; and a frame broadcasting unit 104, configured to send the broadcast frame, so that the access device that receives the broadcast frame and corresponds to the feature identifier in the broadcast frame accesses the access point.

The broadcast frame further includes information about a contention service period, so that the access device that receives the broadcast frame and corresponds to the unique equipment identifier in the broadcast frame accesses the access point by means of contention in the contention service period.

Further, a backoff window used by the access device in the contention service period meets: WL=N*tslot, N=[a*n]−1, and a length of the contention service period meets: L=b*N*tslot;

where WL denotes a maximum time duration of the backoff window; tslot denotes a timeslot; N denotes a value of a greatest multiple of the backoff window; n denotes the number of access devices included in the broadcast frame; a is a constant greater than 1; b is a constant greater than 1; and [ ] denotes rounding down.

Alternatively, the broadcast frame further includes information about a contention free service period, and the contention free server information includes the information about a contention free service period, so that the access device accesses the access point within the contention free service period of the access device.

Figure 11:
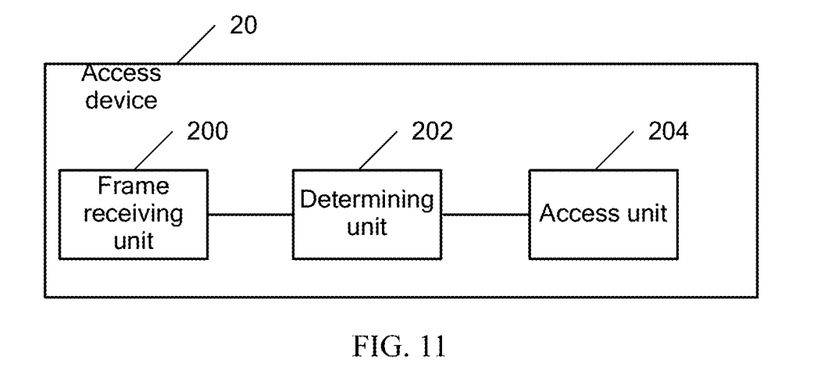
FIG. 11 is a schematic diagram of specific composition of an access device according to an embodiment of the present invention.

As shown in FIG. 11, FIG. 11 is a schematic diagram of specific composition of an access device according to an embodiment of the present invention. The access device 20 includes: a frame receiving unit 200, configured to receive a broadcast frame sent by an access point, where the broadcast frame includes a feature identifier of the access device; a determining unit 202, configured to determine, according to its own feature identifier and the feature identifier of the access device in the broadcast frame, whether the access device is a device paged by the access point; and an access unit 204, configured to access the access point when a determining result is yes.

The broadcast frame further includes information about a contention service period, and the access unit 204 is specifically configured to access the access point by means of contention within the contention service period.

Alternatively, the broadcast frame further includes information about a contention free service period, the information about a contention free service period includes the information about a contention free service period, and the access unit 204 is specifically configured to access the access point within the contention free service period of the access device.

Figure 12:
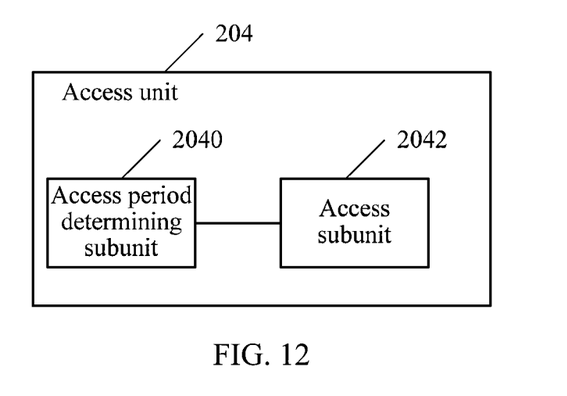
FIG. 12 is a schematic diagram of specific composition of an access unit in FIG. 11.

Further, the feature identifier of the access device includes a unique equipment identifier of the access device, the broadcast frame includes a list of access devices, the list of access devices includes the unique equipment identifier of the access device, and the information about a contention free service period includes a start time of the contention free service period and a time length for accessing the access point by the access device in a contention-free manner. As shown in FIG. 12, the access unit 204 includes: an access period determining subunit 2040, configured to determine the contention free service period of the access device according to the start time of the contention free service period, the time length for accessing the access point by the access device in a contention-free manner, and a position of the unique equipment identifier of the access device in the list of access devices in the broadcast frame; and an access subunit 2042, configured to access the access point within the contention free service period of the access device.

Figure 13:
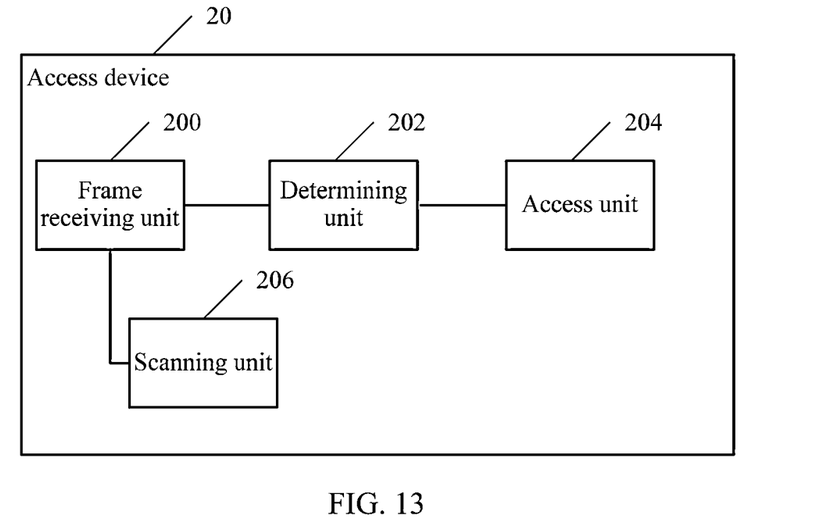
FIG. 13 is a schematic diagram of another specific composition of an access device according to an embodiment of the present invention.

As shown in FIG. 13, the access device 20 may further include: a scanning unit 206, configured to perform passive scanning to discover an access point, and wait for the discovered access point to send the broadcast frame.

Terms and details in the foregoing apparatus embodiments are consistent with those in the foregoing method embodiments, and are not described herein again.

According to the foregoing description, in the embodiments of the present invention, an access point actively pages an access device by carrying a feature identifier of the access device in a broadcast frame, and only an access device specified in the broadcast frame can initiate contention access. In this way, when the access point needs to support access of more devices, the access point may effectively restrict the number of devices that access the access point by means of contention in a same period of time, thereby significantly improving access efficiency.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

What is disclosed above is merely an exemplary embodiment of the present invention, and certainly, is not intended to limit the scope of the claims of the present invention. Therefore, equivalent variations made according to claims of the present invention shall still fall within the scope of the present invention.

What is claimed is:

1. A device access method, wherein the method comprises:
generating, by an access point, a broadcast frame, wherein the broadcast frame comprises a feature identifier of an access device paged by the access point and includes a length (L) of a contention service period, and
sending, by the access point, the broadcast frame to the access device, to enable the access device in the broadcast frame to access the access point within the contention service period;
wherein the length (L) of the contention service period is linearly proportional to a product of a timeslot (tslot) for the access device to connect through a contention and a value (N) of a greatest number of backoff windows;
wherein the contention service period is used to enable the access device which corresponds to a unique equipment identifier in the broadcast frame to access the access point by means of through contention in the contention service period;
wherein a maximum time duration of the backoff windows equals N*tslot where the value N equals −1 and the length (L) of the contention service period equals b*N*tslot; wherein n denotes a quantity of access devices that are paged by the access point and comprised in the broadcast frame; a is a constant greater than 1; b is a constant greater than 1; and denotes rounding down.

2. The method according to claim 1, wherein the feature identifier identifies the access device paged by the access point and comprises a unique equipment identifier of the access device, and before the generating the broadcast frame, the method further comprises:
obtaining, by the access point, the unique equipment identifier of the access device paged by the access point.

3. The method according to claim 2, wherein the obtaining the unique equipment identifier of the access device comprises:
receiving, by the access point from a service server, the unique equipment identifier of the access device covered by the access point.

4. The method according to claim 1, wherein the broadcast frame further comprises information about a contention free service period of the access device, to enable the access device to access-the access point within the contention free service period of the access device.

5. A device access method, wherein the method comprises:
receiving, by a first access device, a broadcast frame sent by an access point, wherein the broadcast frame comprises a feature identifier of an access device paged by the access point and includes a length (L) of a contention service period;
determining, by the first access device according to its own feature identifier and the feature identifier of the access device in the broadcast frame, whether the first access device is the access device paged by the access point; and
accessing, by the first access device, the access point within the contention service period when a determining result is yes;
wherein the length (L) of the contention service period is linearly proportional to a product of a timeslot (tslot) for the access device to connect through a contention and a value (N) of a greatest number of backoff windows;
wherein the accessing, by the first access device, the access point comprises accessing, by the access device through contention, the access point within the contention service period;
wherein a maximum time duration of the backoff windows equals N*tslot where the value N equals −1 and the length (L) of the contention service period equals b*N*tslot; wherein n denotes a quantity of access devices that are paged by the access point and comprised in the broadcast frame; a is a constant greater than 1; b is a constant greater than 1; and denotes rounding down.

6. The method according to claim 5, wherein the broadcast frame further comprises information about a contention free service period of the access device, and the accessing, by the first access device, the access point comprises:
accessing, by the first access device, the access point within the contention free service period of the access device.

7. The method according to claim 6, wherein the feature identifier of the access device comprises a unique equipment identifier of the access device, the broadcast frame comprises a list of access devices, the list of access devices comprises the unique equipment identifier of the access device, the information about the contention free service period comprises a start time of the contention free service period and a time length for accessing the access point in a contention-free manner, and the accessing, by the first access device, the access point within the contention free service period of the access device comprises:
determining, by the first access device, the contention free service period of the access device according to the start time of the contention free service period, the time length for accessing the access point in a contention-free manner, and a position of the unique equipment identifier of the access device in the list of access devices; and
accessing, by the access device, the access point within the contention free service period of the access device.

8. The method according to claim 5, wherein before the receiving, by the first access device, the broadcast frame sent by the access point, the method further comprises:
performing, by the first access device, passive scanning to discover the access point, and waiting for the discovered access point to send the broadcast frame.

9. An access point, wherein the access point comprises a processor and a non-transitory processor-readable medium having processor-executable instructions stored thereon, the processor-executable instructions including a plurality of units, the units including:
a frame generating unit, configured to generate a broadcast frame, wherein the broadcast frame comprises a feature identifier of an access device paged by the access point and includes a length (L) of a contention service period, and
a frame broadcasting unit, configured to send the broadcast fame to the access device, to enable the access device in the broadcast frame to access the access point within the contention service period;
wherein the length (L) of the contention service period is linearly proportional to a product of a timeslot (tslot) for the access device to connect through a contention and a value (N) of a greatest number of backoff windows;
wherein the broadcast frame further comprises information about a contention service period, to enable the access device that receives the broadcast frame and corresponds to a unique equipment identifier in the broadcast frame to access the access point through contention in the contention service period;
wherein a maximum time duration of the backoff windows equals N*tslot where the value N equals −1 and the length (L) of the contention service period equals b*N*tslot; wherein n denotes a quantity of access devices that are paged by the access point and comprised in the broadcast frame; a is a constant greater than 1; b is a constant greater than 1; and denotes rounding down.

10. The access point according to claim 9, wherein the access point further comprises:
an identifier obtaining unit, configured to obtain the feature identifier of the access device, wherein the feature identifier identifies the access device paged by the access point and comprises a unique equipment identifier of the access device paged by the access point.

11. The access point according to claim 10, wherein the broadcast frame further comprises information about a contention free service period of the access device, to enable the access device paged by the access point to access the access point within the contention free service period of the access device.

12. An access device, wherein the access device comprises a processor and a non-transitory processor-readable medium having processor-executable instructions stored thereon, the processor-executable instructions including a plurality of units, the units including:
a frame receiving unit, configured to receive a broadcast frame sent by an access point, wherein the broadcast frame comprises a feature identifier of an access device paged by the access point and includes a length (L) of a contention service period;
a determining unit, configured to determine, according to its own feature identifier and the feature identifier of the access device in the broadcast frame, whether the access device is the device paged by the access point; and
an access unit, configured to access the access point within the contention service period when a determining result is yes;
wherein the length (L) of the contention service period is linearly proportional to a product of a timeslot (tslot) for the access device to connect through a contention and a value (N) of a greatest number of backoff windows;
wherein the access unit is further configured to access the access point through contention in the contention service period;

wherein a maximum time duration of the backoff windows equals N*tslot where the value N equals $\lfloor a^n \rfloor -1$ and the length (L) of the contention service period equals b*N*tslot; wherein n denotes a quantity of access devices that are paged by the access point and comprised in the broadcast frame; a is a constant greater than 1; b is a constant greater than 1; and $\lfloor \rfloor$ denotes rounding down.

13. The access device according to claim 12, wherein the broadcast frame further comprises information about a contention free service period of the access device, and the access unit is further configured to access the access point within the contention free service period of the access device.

14. The access device according to claim 13, wherein the feature identifier of the access device comprises a unique equipment identifier of the access device paged by the access point, the broadcast frame comprises a list of access devices, the list of access devices comprises the unique equipment identifier of the access device paged by the access point, the information about the contention free service period comprises a start time of the contention free service period and a time length for accessing the access point by the access device in a contention-free manner, and the access unit comprises:

an access period determining subunit, configured to determine the contention free service period of the access device according to the start time of the contention free service period, the time length for accessing, in the contention-free manner, the access point by the access device paged by the access point, and a position of the unique equipment identifier of the access device in the list of access devices in the broadcast frame; and an access subunit, configured to access the access point within the contention free service period of the access device.

15. The access device according to claim 12, wherein the access device further comprises a scanning unit, wherein before the frame receiving unit receives the broadcast frame sent by the access point, the scanning unit is configured to perform passive scanning to discover the access point, and wait for the discovered access point to send the broadcast frame.

* * * * *